United States Patent
Suzuki et al.

(10) Patent No.: US 12,292,189 B2
(45) Date of Patent: May 6, 2025

(54) RICH-LEAN FLAME BURNER

(71) Applicant: RINNAI CORPORATION, Aichi (JP)

(72) Inventors: Masahiro Suzuki, Aichi (JP); Hiroitsu Ota, Aichi (JP)

(73) Assignee: RINNAI CORPORATION, Aichi (JP)

( * ) Notice: Subject to any disclaimer, the term of this patent is extended or adjusted under 35 U.S.C. 154(b) by 440 days.

(21) Appl. No.: 18/046,315

(22) Filed: Oct. 13, 2022

(65) Prior Publication Data

US 2023/0146028 A1 May 11, 2023

(30) Foreign Application Priority Data

Nov. 11, 2021 (JP) .................................. 2021-184244

(51) Int. Cl.
*F23D 14/58* (2006.01)

(52) U.S. Cl.
CPC .................................. *F23D 14/586* (2013.01)

(58) Field of Classification Search
CPC ...... F23D 14/586; F23D 14/26; F23D 14/583; F23D 14/10
USPC ................ 431/354, 278, 285, 308, 346, 345
See application file for complete search history.

(56) References Cited

U.S. PATENT DOCUMENTS

2013/0149653 A1* 6/2013 Fukunishi ............... F23D 14/02
431/278

FOREIGN PATENT DOCUMENTS

JP         2008-286448 A    11/2008

* cited by examiner

*Primary Examiner* — Vivek K Shirsat
(74) *Attorney, Agent, or Firm* — Future IP LLC; Tomoko Nakajima

(57) ABSTRACT

A rich-lean flame burner having on an upper part thereof: a longitudinally elongated lean burner port; and a rich burner port lying adjacent to at least one lateral side of the lean burner port with a clearance therebetween. At a plurality of longitudinal points of straightening members having a plurality of straightening plates which divide the lean burner port into a plurality of laterally sectioned regions, there are disposed first constricted portions which bring upper parts of the straightening plates into intimate contact with each other. Second constricted portions are disposed in at least laterally outermost straightening plates to further divide each portion of the lean burner port that has been divided by the first constricted portions. The second constricted portions are such that the lower end thereof is positioned above the lower end of the first constricted portions, and that the vertical length is shorter than the first constricted portions.

4 Claims, 7 Drawing Sheets

RICH-LEAN FLAME BURNER

This application is a claims priority under 35 U.S.C. § 119 to Japanese Patent Application No. 2021-184244, filed Nov. 11, 2021, which is incorporated by reference.

BACKGROUND OF THE INVENTION

Technical Field

The present invention relates to a rich-lean flame burner comprising on an upper part thereof a longitudinally elongated lean burner port for ejecting a lean air-fuel mixture whose fuel concentration is leaner than a theoretical air fuel ratio; and a rich burner port lying adjacent to at least one lateral side of the lean burner port with a clearance of a predetermined lateral width for ejecting a rich air-fuel mixture whose fuel concentration is richer than the theoretical air fuel ratio.

Background Art

Conventionally, this kind of rich-lean flame burner is provided with a straightening member having a plurality of straightening plates for dividing the lean burner port into a plurality of laterally sectioned regions (see, e.g., patent documents 1). Further, at a plurality of longitudinal points of the straightening member, constricted portions are disposed by bringing the plurality of straightening plates into close contact with one another at upper parts of the straightening plates, so as to divide the lean burner port into a plurality of longitudinally divided portions.

By the way, in this kind of rich-lean flame burner, the rich air-fuel mixture ejected from the rich burner port will be combusted, in the outside portion opposite to the lean burner port, by the supply of the secondary air that flows along the outside of the burner. In the inside portion closer to the lean burner port, the rich air-fuel mixture will be combusted in a position above the clearance by the supply of the excess air in the lean air-fuel mixture. Then, once uniform flames have been formed above the clearance over a longitudinally wide range by the combustion of the air-fuel mixture in the neighborhood of the excess air ratio of 1.0, resonance vibrations at frequencies of about 200 Hz to 250 Hz are likely to occur.

Here, in the longitudinal positions that coincide with the constricted portions, the supply of the excess air in the lean air-fuel mixture into the rich air-fuel mixture will be restrained, and there will no longer be formed, above the clearance, flames by the combustion of the air-fuel mixture in the neighborhood of the excess air ratio of 1.0. Therefore, by increasing the number of constricted portions, such flames by the combustion of the air-fuel mixture in the neighborhood of the excess air ratio of 1.0 as will be formed above the clearance, will be fragmented (broken down). As a result, the occurrence of resonance vibrations at frequencies of about 200 Hz to 250 Hz can be restrained. However, by simply increasing the number of constricted portions, mass flow resistance of the lean air-fuel mixture in the straightening member will increase.

PRIOR ART DOCUMENT

Patent Document

Patent Document 1: JP-A2008-286448

SUMMARY OF THE INVENTION

Problems that the Invention is to Solve

In view of the above-mentioned points, this invention has a problem of providing a rich-lean flame burner in which resonance vibrations at frequencies of about 200 Hz to 250 Hz can be restrained from occurring without considerably increasing the mass flow resistance of the lean air-fuel mixture through the straightening members.

Means for Solving the Problems

In order to solve the above-mentioned problems, this invention is a rich-lean flame burner comprising on an upper part thereof: a longitudinally elongated lean burner port for ejecting a lean air-fuel mixture whose fuel concentration is leaner than a theoretical air fuel ratio; and a rich burner port lying adjacent to at least one lateral side of the lean burner port with a clearance of a predetermined lateral width for ejecting a rich air-fuel mixture whose fuel concentration is richer than the theoretical air fuel ratio. The rich-lean flame burner further comprises: a straightening member having a plurality of straightening plates for dividing the lean burner port into a plurality of laterally sectioned regions; and, at a plurality of longitudinal points of the straightening member, first constricted portions by bringing the plurality of straightening plates into close contact with one another, at upper parts of the straightening plates, so as to divide the lean burner port into a plurality of longitudinally divided portions, wherein at least the laterally outermost straightening plate adjacent to the clearance is provided with second constricted portions which, in close contact with the straightening plates adjacent to the laterally outermost straightening plate, further divide each of such portions of the lean burner port as have been divided by the first constricted portions, and wherein the second constricted portions are such that the lower ends thereof are positioned above the lower ends of the first constricted portions and that a vertical length of the second constricted portions is shorter than the first constricted portions.

According to this invention, the straightening member is provided with the second constricted portions in addition to the first constricted portions. Therefore, such flames by the combustion of the air-fuel mixture in the neighborhood of the excess air ratio 1.0 as will be formed above the clearance will be more fragmented than the case in which only the first constricted portions are disposed. As a result, the resonance vibrations at frequencies of about 200 Hz to 250 Hz can be restrained from occurring. In addition, the second constricted portions are arranged such that the lower ends thereof are positioned above the lower ends of the first constricted portions and that the vertical length of the second constricted portions is shorter than that of the first constricted portions. Therefore, the mass flow resistance of the lean air-fuel mixture through the straightening members will not increase much. If the laterally outermost straightening plate adjacent to the clearance is provided with the second constricted portions, the above-mentioned effects can be obtained to a certain degree even if the other straightening plates are not provided with the second constricted portions.

In this invention, in case the plurality of straightening plates are provided with the second constricted portions, the second constricted portions disposed at least in part of the straightening plates among the plurality of straightening plates shall preferably be narrower in longitudinal width than the width of the first constricted portions. According to this arrangement, the increase in the mass flow resistance due to the second constricted portions can still furthermore be restrained.

Further, in this invention, in case the plurality of straightening plates are provided with the second constricted portions, upper ends of the second constricted portions disposed at least in part of the plurality of straightening plates shall preferably be positioned below the upper ends of the straightening plates. According to this arrangement, the lean air-fuel mixture wraps around, at a lower speed, an upper portion of the second constricted portions whose upper ends are positioned below the upper ends of the straightening plates. Stable and short-length flames are thus formed, thereby obtaining flame stabilizing effect.

Further, in this invention, preferably the position of the second constricted portion disposed in one of the straightening plates of respectively two laterally adjoining outside and inside straightening plates, and the position of the second constricted portion disposed in the other of the straightening plates vertically deviate from each other within a range shorter than a vertical length of the second constricted portion, and an upper end of the second constricted portion disposed in one of the straightening plates reaches an upper end of the straightening plate, but an upper end of the second constricted portion disposed in the other straightening plate is positioned below the upper end of the straightening plate. According to this arrangement, not only can the above-mentioned flame retention effect be obtained but also, as described hereinafter, the longitudinal width of the second constricted portions can be made narrower, thereby helping in restraining the mass flow resistance from increasing.

Still furthermore, in this invention a plurality of introduction openings for introducing a part of the lean air-fuel mixture into the clearance are disposed at a longitudinal spacing at positions below the lower ends of the second constricted portions. According to this arrangement, the position at which the excess air ratio becomes 1.0 by the supply of the excess air in the lean air-fuel mixture into the rich air-fuel mixture gets lower due to the supply of the lean air-fuel mixture from the clearance. As a result, the combustion noises by oscillated combustion of relatively lower frequencies of 60 Hz to 80 Hz which occur when the position in question is high can be restrained from occurring.

DESCRIPTION OF PREFERRED EMBODIMENTS

Figure 1:
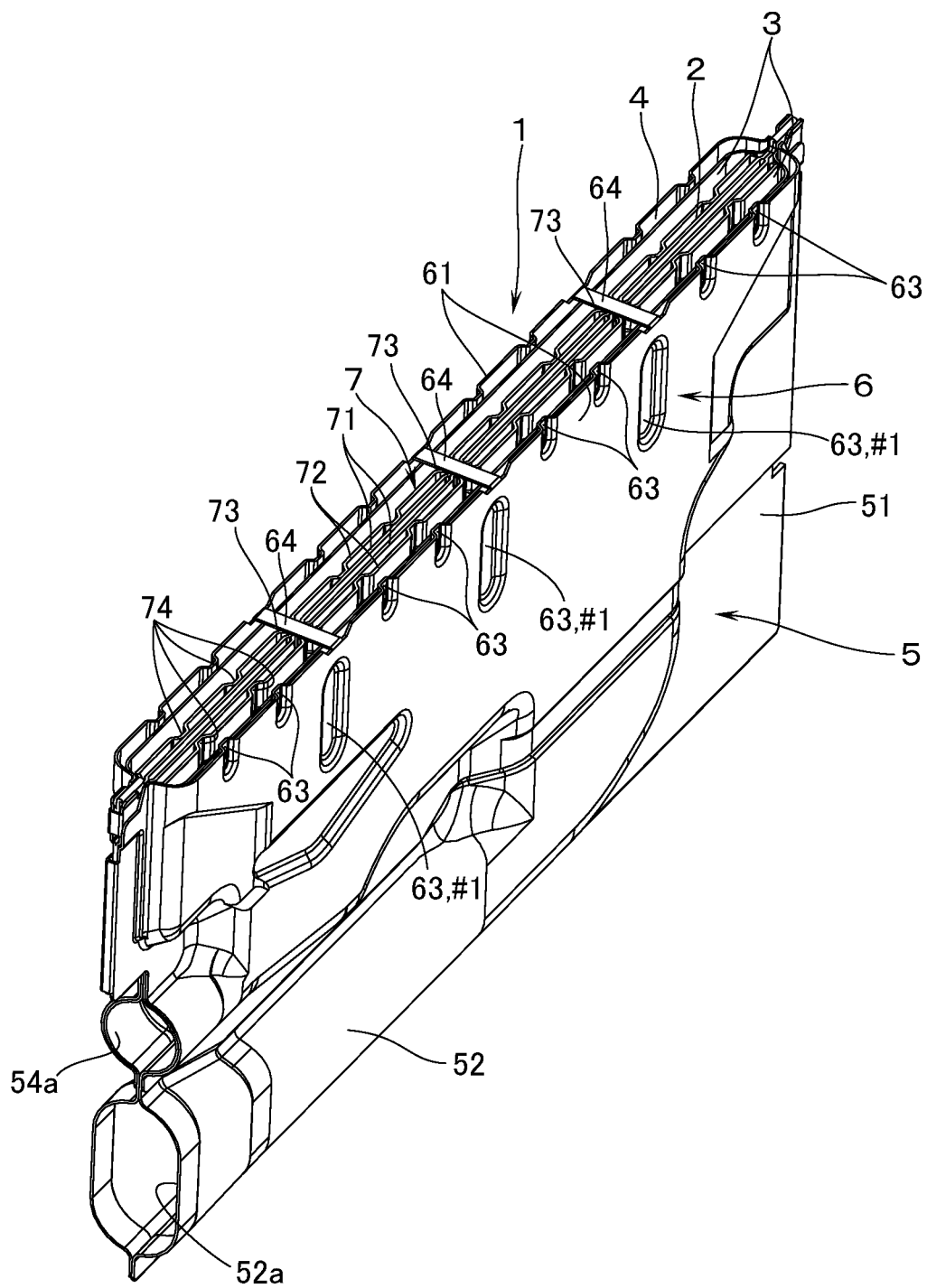
FIG. 1 is a perspective view of a rich-lean flame burner according to an embodiment of this invention.
Figure 2:
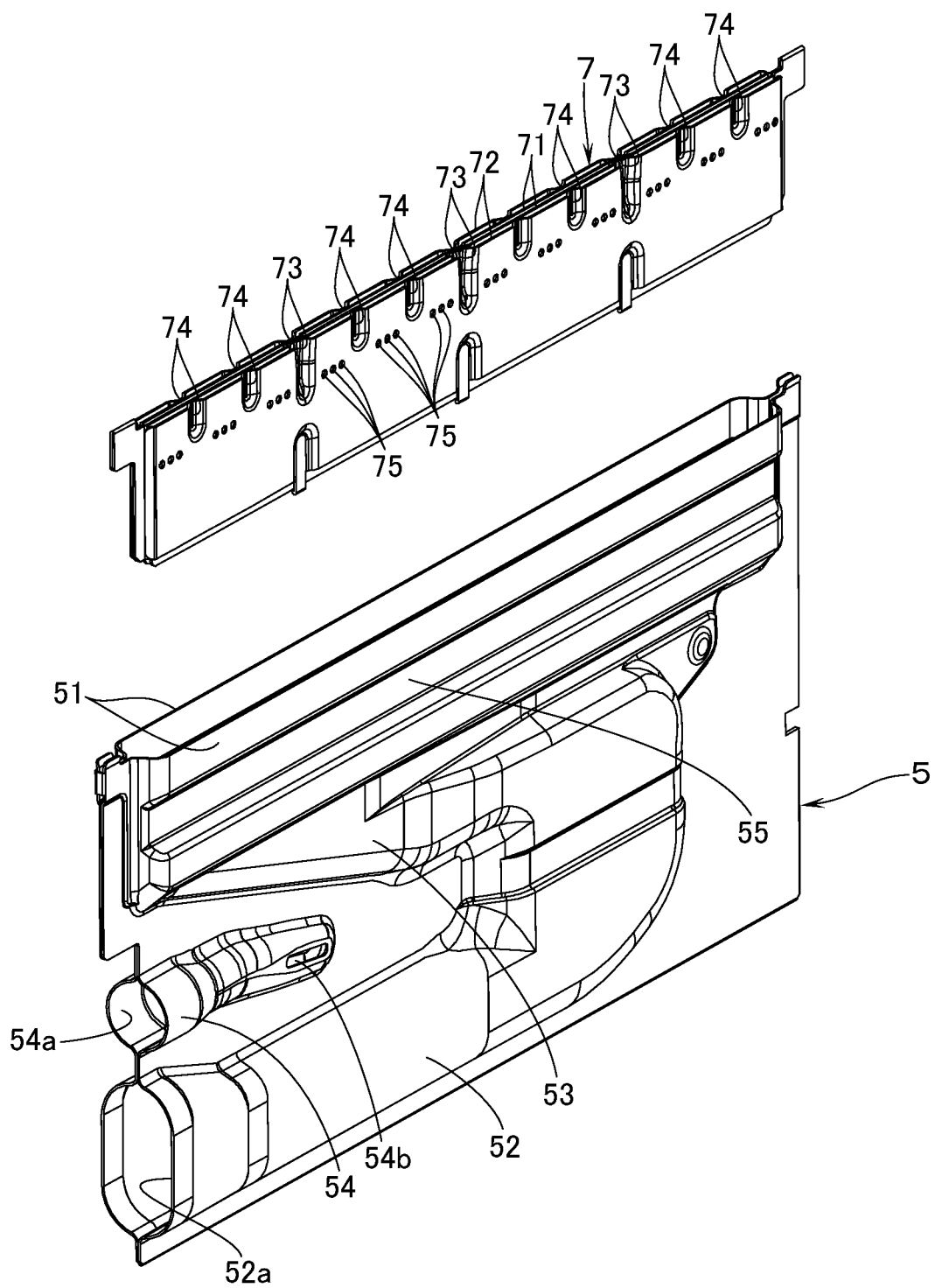
FIG. 2 is a perspective view of the rich-lean flame burner according to the embodiment of this invention, in which a burner main body and a straightening member are shown separated from each other.
Figure 3:
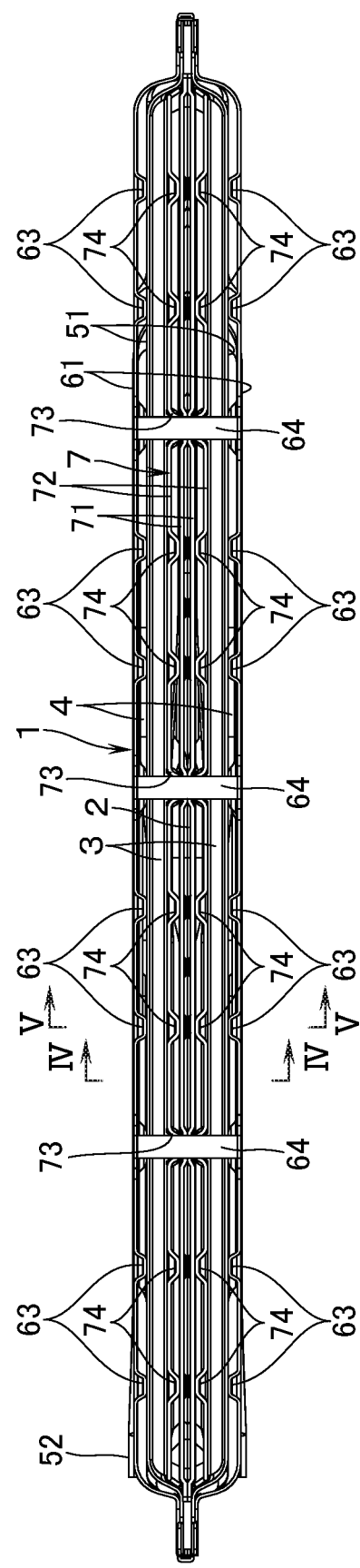
FIG. 3 is a plan view of the rich-lean flame burner according to the embodiment of this invention.
Figure 4:
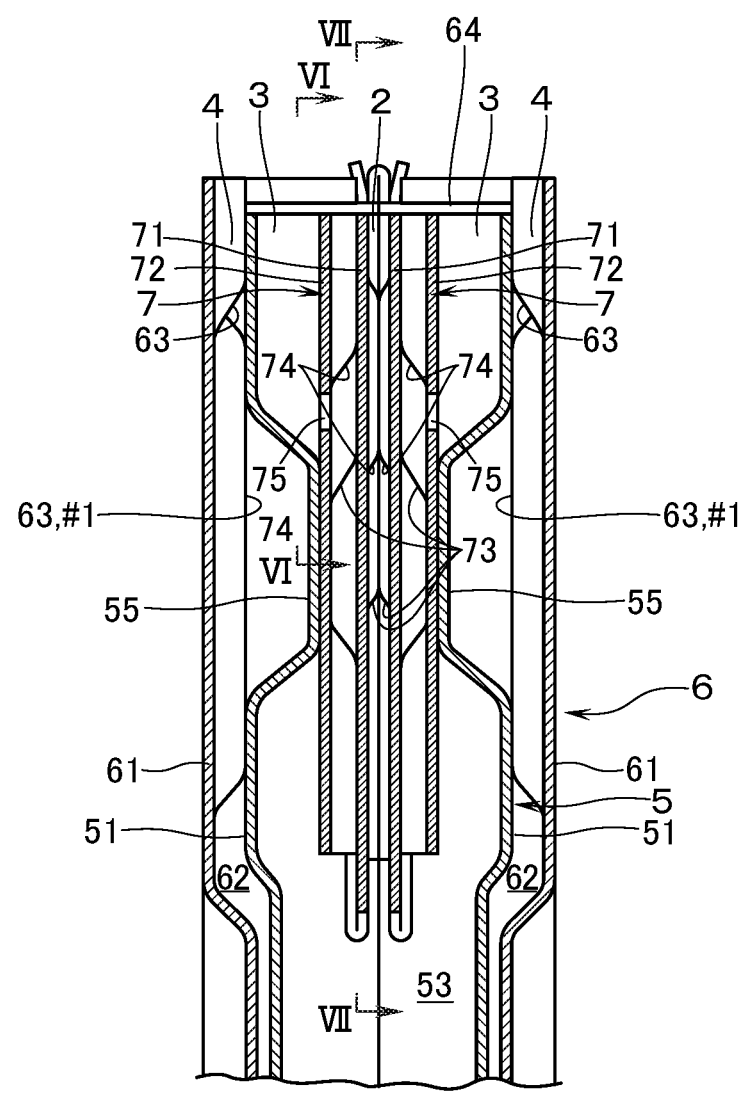
FIG. 4 is an enlarged sectional view taken along the line IV-IV in FIG. 3.

With reference to FIG. 1 through FIG. 4, reference numeral 1 denotes a rich-lean flame burner according to an embodiment of this invention. This rich-lean flame burner 1 has on an upper end thereof: longitudinally elongated lean burner port 2 for ejecting lean air-fuel mixture having a fuel concentration leaner than a theoretical air fuel ratio; and a pair of rich burner ports 4, 4 lying adjacent to both lateral sides of the lean burner port 2 in a manner to respectively sandwich clearances 3, 3 of predetermined lateral widths, the rich burner ports 4, 4 ejecting a rich air-fuel mixture that is richer than the theoretical air-fuel ratio.

The rich-lean flame burner 1 includes the following burner constituent members, i.e., a burner main body 5 and a burner cap 6. The burner main body 5 has a pair of side plates 51, 51 which laterally face each other. Between an upper end of each of these side plates 51, 51 there is defined the lean burner port 2 and the clearances 3, 3 on laterally both sides of the lean burner port 2. The burner cap 6 has a pair of side plates 61, 61 which cover the burner main body 5 from laterally both sides. Between an upper end of each of these side plates 61, 61 and an upper end of each of these side plates 51, 51 of the burner main body 5, there are defined the rich burner ports 4, 4. The rich-lean flame burner 1 also has a straightening member 7 mounted between the upper ends of both the side plates 51, 51 of the burner main body 5. The straightening member 7 has a plurality of straightening plates 71, 72 which divide the lean burner port 2 into a plurality of laterally sectioned regions.

Both the side plates 51, 51 of the burner main body 5 are formed by bending a single plate, into the shape of a principal rafter, along a bending line which forms a lower edge of the burner main body 5. Further, the burner main body 5 is provided with: a lean mixing tube portion 52 which is formed by press-working both side plates 51, 51 so as to be elongated backward from an inlet port 52a which opens at a lower front end of the burner main body 5; and a lean passage portion 53 for introducing the lean air-fuel mixture from the lean mixing tube portion 52 into the lean burner port 2. The opening area of the inlet port 52a of the lean mixing tube portion 52 is relatively large. Therefore, together with the fuel gas from a lean gas nozzle (not illustrated) which lies opposite to the inlet port 52a, a relatively large amount of primary air will flow into the lean mixing tube portion 52, whereby the lean air-fuel mixture will be generated. The lean passage portion 53 is elongated in a manner to expand from a rear end of the lean mixing tube portion 52 upward in a manner to expand forward.

In a portion between the lean mixing tube portion 52 and the lean passage portion 53 of the burner main body 5, there is disposed a rich mixing tube portion 54 which is formed by press-working both the side plates 51, 51. The rich mixing tube portion 54 is elongated slightly rearward from an inlet port 54a that opens at a front end of the burner main body 5, and ends therein. The rich mixing tube portion 54 has an outlet port 54b opened on a rear outside surface thereof. The opening area of the inlet port 54a of the rich mixing tube portion 54 is relatively small. Therefore, as a result of flowing in of a relatively small amount of primary air flows into the rich mixing tube portion 54 together with the fuel gas from the rich gas nozzles (not illustrated) that lie opposite to the inlet port 54a. Rich air-fuel mixture is generated in this manner.

The rich air-fuel mixture that goes out of the outlet port 54b of the rich mixing tube portion 54 is introduced into each of the rich burner ports 4 through a rich passage portion 62 which is defined between each of the side plates 51 of the burner main body 5 and each of the side plates 61 of the burner cap 6. Further, at a plurality of longitudinal positions on an upper portion of each of the side plates 61 of the burner cap 6, there are formed recessed portions 63 in a manner to divide the rich burner ports 4 into a plurality (specifically 12 pieces) of longitudinally divided portions.

The straightening member 7 has: a pair of inside straightening plates 71, 71 on a laterally inside; and a pair of outside straightening plates 72, 72 which are positioned on laterally both outsides. Further, on an upper part of each of the side plates 51 of the burner main body 5, there is formed a longitudinally elongated recessed section (groove) 55 which is in contact with the outside straightening plate 72 that is a laterally outermost straightening plate of the straightening member 7. Then, the clearance 3 is arranged to be defined between such a portion of the side plate 51 as is above this recessed section 55 and the outside straightening plate 72.

Figure 5:
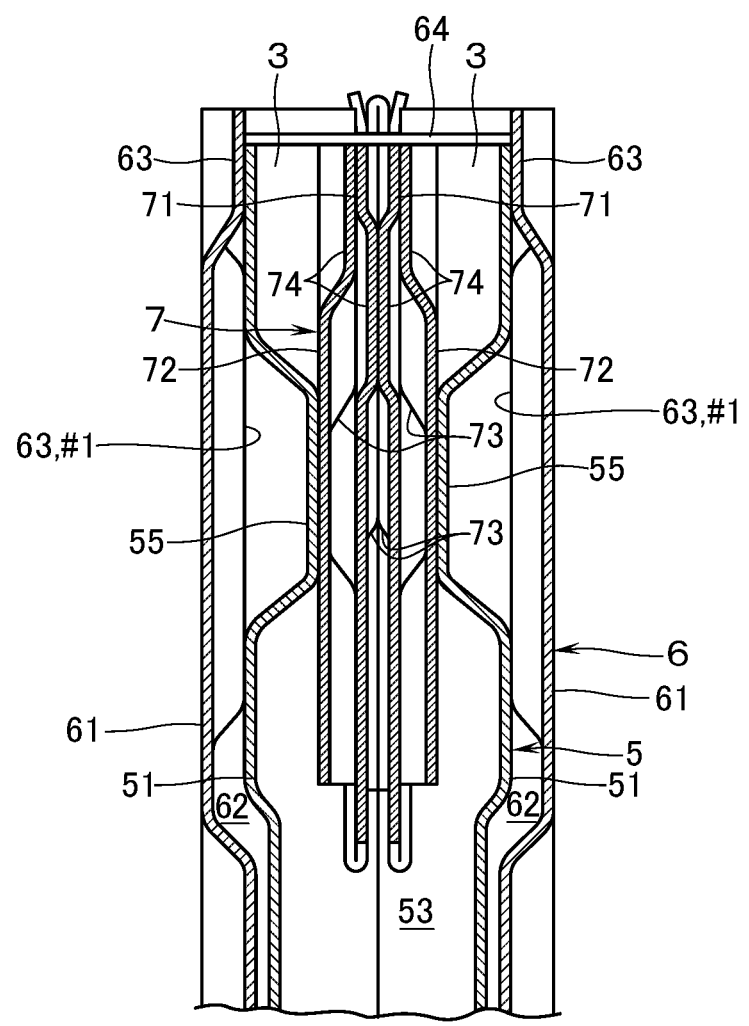
FIG. 5 is an enlarged sectional view taken along the line V-V in FIG. 3.

At a plurality of longitudinal positions (specifically at three positions) of the straightening member 7, there are disposed first constricted portions 73. Each of the first constricted portions 73 is arranged to bring a plurality of straightening plates 71, 72 into close contact with each other at their upper portions so as to divide the lean burner port 2 into a plurality (specifically four pieces) of longitudinally divided portions. In addition, each of the straightening plates 71, 72 is provided with second constricted portions 74 which, by bringing a plurality of laterally adjacent straightening plates 71, 72 into close contact with each other at the upper parts thereof, further divide each portion of the lean burner port 2 that has been divided by the first constricted portions 73 into a plurality (specifically three pieces) of longitudinally divided portions. Specifically, as shown in FIG. 5, as a result of bringing the second constricted portions 74, 74, which are disposed in a pair of inside straightening plates 71, 71 and being dented laterally inward, into close contact with each other, the region of the lean burner ports 2 between both the inside straightening plates 71, 71 is longitudinally divided. Furthermore, as a result of bringing the second constricted portions 74, which are disposed in the outside straightening plate 72 that is such a laterally outermost straightening plate as is adjacent to the clearance 3, into close contact with the inside straightening plates 71, the region of the lean burner port 2 between the inside straightening plates 71 and the outside straightening plates 72 becomes longitudinally divided.

By the way, the longitudinal position of each of the first and the second constricted portions 73, 74 of the straightening member 7 is the same as the longitudinal position of each of the recessed portions 63 of the side plate 61 of the burner cap 6. Further, the recessed portions 63 having affixed thereto reference marks of #1 in FIG. 1 and that are the same in the longitudinal position with the first constricted portions 73 are larger than the other recessed portions 63. Further, the burner caps 6 are provided with bridge parts 64 which couple the upper edges of both the side plates 61, 61 of the burner caps 6 in the same longitudinal position as the first constricted portions 73.

Figure 6:
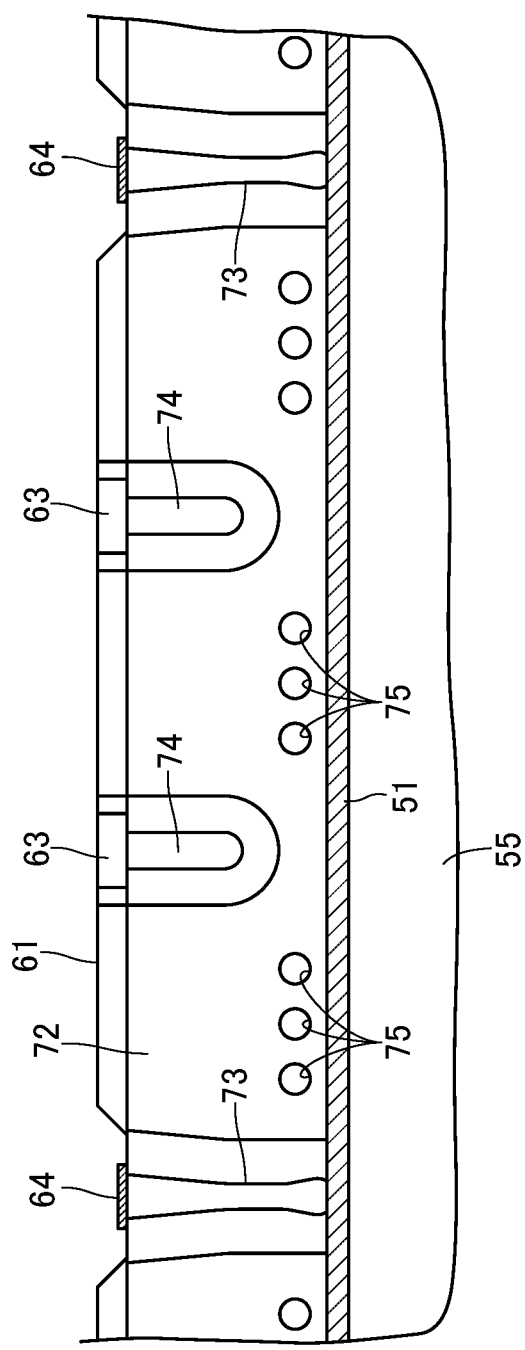
FIG. 6 is a sectioned side view taken along the line VI-VI in FIG. 4.
Figure 7:
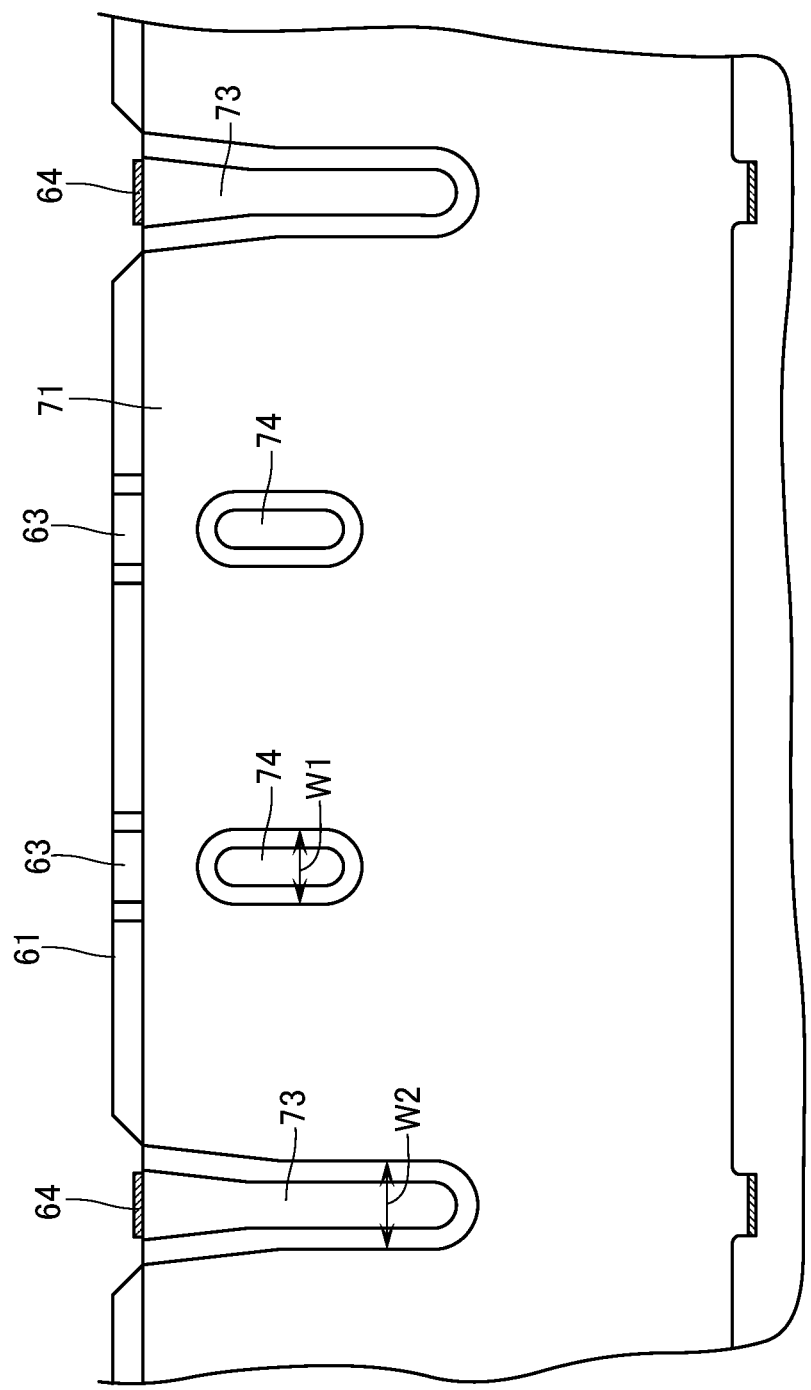
FIG. 7 is a sectioned side view taken along the line VII-VII in FIG. 4.

With reference also to FIG. 6 and FIG. 7, the lower ends of the second constricted portions 74 are positioned above the lower ends of the first constricted portions 73, and the vertical length of the second constricted portions 74 are shorter than the vertical lengths of the first constricted portions 73. Further, the second constricted portions 74 disposed in the outside straightening plates 73 are equivalent to the first constricted portions 73 in the longitudinal widths, but the longitudinal widths W1 of the second constricted portions 74 disposed in the inside straightening plates 71 are arranged to be narrower than the longitudinal widths W2 of the first constricted portions 73. Alternatively, the following arrangement may also be employed. Namely, the longitudinal widths of the second constricted portions 74 disposed in the outside straightening plates 72 are made narrower than the longitudinal widths of the first constricted portions 73 so that the longitudinal widths of the second constricted portions 74 disposed in the inside straightening plates 71 may be made to be equivalent to the longitudinal widths of the first constricted portions 73. Or else, the longitudinal widths of the second constricted portions 74 disposed in the inside and the outside straightening plates 71, 72 may be made to be narrower than the longitudinal widths of the first constricted portions 73. What is important is that the longitudinal width of the second constricted portions 74 disposed in at least part of the plurality of straightening plates 71, 72 of the straightening member 7 may be made narrower than the longitudinal widths of the first constricted portions 73.

By disposing the second constricted portions 74 as described above, the flames formed above the clearance 3 by the combustion of the air-fuel mixture in the neighborhood of excess air ratio of 1.0 can be fragmented as compared with an arrangement in which only the first constricted portions 73 are disposed in the straightening member 7. As a result, the resonance vibrations at frequencies of about 200 Hz to 250 Hz can be restrained from occurring. In addition, since the second constricted portions 74 are such that the lower ends thereof are positioned above the lower ends of the first constricted portions 73 and that the vertical lengths are shorter than the first constricted portions 73, the mass flow resistance of the lean air-fuel mixture at the straightening members 7 will not increase much. Furthermore, by making narrower the longitudinal widths of the second constricted portions 74 disposed in at least part of a plurality of straightening plates among a plurality of straightening plates 71, 72 of the straightening members 7, than the longitudinal widths of the first constricted portions 73, the increase in the mass flow resistance by the second constricted portions 74 can further be restrained.

By the way, it may also be considered to reduce the mass flow resistance by reducing the vertical lengths or the longitudinal widths of the first constricted portions 73. However, it is required that the vertical length of the first constricted portions 73 be kept above a certain degree in order to straighten, so as to look upward, the flow of the lean air-fuel mixture that flows into front parts or rear parts of the lean burner ports 2 and that has relatively largely inclined in the vertical direction. Further, in order for the flames not to roast the bridge part 64, it is necessary to make the longitudinal widths of the first constricted portions 73 positioned right below the bridge part 64 to be above a certain degree. It is therefore not preferable to shorten the vertical lengths or the longitudinal widths of the first constricted portions 73.

Further, in this embodiment, the position of the second constricted portions 74 disposed in the inner straightening plates 72 and the position of the second constricted portions 74 disposed in the outside straightening plates 72 are vertically staggered within a range smaller than the vertical lengths of the second constricted portions 74. Specifically, the position of the second constricted portions 74 disposed in the outside straightening plates 72 is deviated upward so that the upper end of the second constricted portions 74 reach the upper end of the outside straightening plates 72. The position of the second constricted portions 74 disposed in the inside straightening plates 71 is deviated downward so that the upper end of the second constricted portions 74 is positioned below the upper end of the inside straightening plates 71.

In case the position of the second constricted portions 74 disposed in the inside straightening plates 71 and the position of the second constricted portions 74 disposed in the outside straightening plates 72 have not been deviated vertically from each other, it becomes necessary to bring into intimate contact the second constricted portions 74 disposed in the outside straightening plates 72 and the second constricted portions 74 disposed in the inside constricted portions 74. This is for the purpose of longitudinally dividing the region of the lean burner ports 2 between the inside straightening plates 71 and the outside straightening plates 72. For that purpose, the longitudinal width of the second constricted portions 74 disposed in the inside straightening plates 71 must be widened so as to be able to accept the second constricted portions 74 disposed in the outside straightening plates 72. On the other hand, according to this embodiment, the upper part of the second constricted portions 74 disposed in the outside straightening plates 72 in a manner to be deviated upward is arranged, as shown in FIG. 5, to be in close contact with such a portion of the inside straightening plates 71 as is above the upper end of the second constricted portion 74 disposed in the inside straightening plates 71. The region of the lean burner ports 2 between the inside straightening plates 71 and the outside straightening plates 72 can thus be longitudinally divided. Therefore, there is no need of arranging that the second constricted portions 74 disposed in the outside straightening plates 72 can be inserted into the second constricted portions 74 disposed in the inside straightening plates 74. Consequently, the longitudinal widths of the second constricted portions 74 disposed in the inside straightening plates 71 can be narrowed, thereby restraining the increase in the mass flow resistance.

In addition, since the upper end of the second constricted portions 74 disposed in the inside straightening plates 71 is positioned below the upper end of the inside straightening plates 71, the lean air-fuel mixture that has flown into the region of the lean burner port 2 between a pair of the inside straightening plates 71, 71 will partly wrap around, at a low speed, above the second constricted portions 74 of the inside straightening plates 71. As a result, stable short flames will be formed above the second constricted portions 74 of the inside straightening plates 71, thereby securing a flame retention effect.

Further, in this embodiment, a plurality of introduction openings 75 for introducing a part of the lean air-fuel mixture into the clearance 3 are disposed at a longitudinal spacing at positions below the lower ends of the second constricted portions 74. In this embodiment, there is disposed no introduction opening 75 immediately below each of the second constricted portions 74. However, it is also possible to dispose the introduction openings 75 in this portion.

If the position at which the excess air ratio becomes 1.0 by the supply of the excess air in the lean air-fuel mixture into the rich air-fuel mixture ejected from the rich burner ports 4 gets higher, a base part on the side of the lean burner port 2 of the rich flames formed by the combustion of the rich air-fuel mixture becomes unstable. As a result, there is a possibility that an oscillated combustion of relatively low frequencies of 60 Hz to 80 Hz occurs, thereby sometimes giving rise to the cause of combustion noises. In this embodiment, since the lean air-fuel mixture is introduced into the clearance 3 through the introduction openings 75, the position at which the excess air ratio becomes 1.0 by the supply of the excess air in the lean air-fuel mixture into the rich air-fuel mixture gets lower due to the supply of lean air-fuel mixture from the clearance 3. As a result, the combustion noises due to oscillated combustion of relatively low frequencies in the range of 60 Hz to 80 Hz can be restrained from occurring.

Descriptions have so far been made of the embodiments of this invention with reference to the drawings, but this invention shall not be limited to the above. For example, in the above-mentioned embodiments, a pair of rich burner ports 4, 4 are disposed with the clearance 3, 3 pinched on both lateral sides of the lean burner port 2. This invention can similarly be applicable to the rich-lean burner having disposed the clearance only on one lateral side of the lean burner port.

In addition, unlike the above-mentioned embodiments, instead of disposing the second constricted portions 74 in the pair of the inside straightening plates 71, 71, the second constricted portions 74 may be disposed only in a pair of the outside straightening plates 72, 72. Also in this case, such flames by the combustion of the air-fuel mixture in the neighborhood of the excess air ratio 1.0 as are formed above the clearance 3 are more subdivided than the case in which the straightening members 7 are provided only with the first straightening members 73. As a result, the occurrence of resonance vibrations at frequencies of about 200 Hz to 250 Hz can be restrained to a certain degree.

Still furthermore, the straightening members 7 in the above-mentioned embodiments have four pieces of straightening plates. It may be so arranged that they are made up of six straightening plates, i.e., a pair of inside straightening plates, a pair of intermediate straightening plates, and a pair of outside straightening plates. In this case, preferably the following arrangements may be made. Namely, the position of the second constricted portion disposed in the outside straightening plates is deviated upward so that the upper end of the second constricted portion reaches the upper end of the outside straightening plates. The position of the second constricted portion disposed in the intermediate straightening plates is deviated downward so that the upper end of the second constricted portion is positioned below the upper end of the intermediate straightening plates. And the position of the second constricted portion disposed in the inside straightening plates is deviated upward so that the upper end of the second constricted portion reaches the upper end of the inside straightening plates. Then, such an upper portion of the second constricted portion as is disposed in the outside straightening plates comes into close contact with such a portion of the intermediate straightening plates as is above the upper end of the second constricted portion disposed in the intermediate straightening plates. As a result, such a region of the lean burner port as is present between the outside straightening plates and the intermediate straightening plates will be longitudinally divided. Such a lower portion of the second constricted portion as is disposed in the intermediate straightening plates comes into close contact with such a portion of the inside straightening plate as is below the lower end of the second constricted portion disposed in the inside straightening plates. As a result, such a region of the lean burner port as is present between the intermediate straightening plates and the inside straightening plates will be longitudinally divided. The second constricted portions disposed in a pair of the inside straightening plates are brought into close contact with each other, so that such a region of the lean burner port as is disposed between both the inside straightening plates will be longitudinally divided. By the way, the position of the second constricted portions disposed in the outside straightening plates may be deviated downward, the position of the second constricted portions disposed in the intermediate straightening plates

| EXPLANATION OF MARKS | | | |
|---|---|---|---|
| 1 | rich-lean flame burner | | |
| 2 | lean burner port | 3 | clearance |
| 4 | rich burner port | 5 | burner main body |
| 51 | side plate | 6 | burner cap |
| 61 | side plate | 7 | straightening member |
| 71 | inside straightening plate | | |
| 72 | outside straightening plate (laterally outermost straightening plate) | | |
| 73 | first constricted portion | | |
| 74 | second constricted portion | | |
| 75 | introduction opening | | |

What is claimed is:

1. A rich-lean flame burner comprising on an upper part thereof: a longitudinally elongated lean burner port for ejecting a lean air-fuel mixture whose fuel concentration is leaner than a theoretical air fuel ratio; and a rich burner port lying adjacent to at least one lateral side of the lean burner port with a clearance of a predetermined lateral width for ejecting a rich air-fuel mixture richer than the theoretical air fuel ratio;

the rich-lean flame burner further comprising: a straightening member having a plurality of straightening plates for dividing the lean burner port into a plurality of laterally sectioned regions; and, at a plurality of longitudinal points of the straightening member, first constricted portions by bringing the plurality of straightening plates into close contact with one another, at upper parts of the straightening plates, so as to divide the lean burner port into a plurality of longitudinally divided portions, wherein at least the laterally outermost straightening plate adjacent to the clearance is provided with second constricted portions which, in close contact with the straightening plate adjacent to the laterally outermost straightening plate, divide each of such portions of the lean burner port as have been divided by the first constricted portions into a plurality of longitudinally divided portions, and wherein the second constricted portions are such that the lower ends thereof are positioned above the lower ends of the first constricted portions and that a vertical length of the second constricted portions is shorter than the first constricted portions, and wherein the plurality of straightening plates are provided with the second constricted portions, upper ends of the second constricted portions disposed at least in part of the plurality of straightening plates are positioned below the upper ends of the straightening plates.

2. The rich-lean flame burner according to claim1, wherein the plurality of straightening plates are provided with the second constricted portions, the second constricted portions disposed at least in part of the straightening plates among the plurality of straightening plates are narrower in longitudinal width than a width of the first constricted portions.

3. The rich-lean flame burner according to claim 1,
wherein the position of the second constricted portion disposed in one of the straightening plates of respectively two laterally adjoining outside and inside straightening plates, and the position of the second constricted portion disposed in the other of the straightening plates vertically deviate from each other within a range shorter than a vertical length of the second constricted portion, and wherein an upper end of the second constricted portion disposed in one of the straightening plate reaches an upper end of the straightening plate, but an upper end of the second constricted portion disposed in the other straightening plate is positioned below the upper end of the straightening plate.

4. A rich-lean flame burner comprising on an upper part thereof: a longitudinally elongated lean burner port for ejecting a lean air-fuel mixture whose fuel concentration is leaner than a theoretical air fuel ratio; and a rich burner port lying adjacent to at least one lateral side of the lean burner port with a clearance of a predetermined lateral width for ejecting a rich air-fuel mixture richer than the theoretical air fuel ratio;

the rich-lean flame burner further comprising: a straightening member having a plurality of straightening plates for dividing the lean burner port into a plurality of laterally sectioned regions; and, at a plurality of longitudinal points of the straightening member, first constricted portions by bringing the plurality of straightening plates into close contact with one another, at upper parts of the straightening plates, so as to divide the lean burner port into a plurality of longitudinally divided portions, wherein at least the laterally outermost straightening plate adjacent to the clearance is provided with second constricted portions which, in close contact with the straightening plate adjacent to the laterally outermost straightening plate, divide each of such portions of the lean burner port as have been divided by the first constricted portions into a plurality of longitudinally divided portions, and wherein the second constricted portions are such that the lower ends thereof are positioned above the lower ends of the first constricted portions and that a vertical length of the second constricted portions is shorter than the first constricted portions, and wherein a plurality of introduction openings for introducing a part of the lean air-fuel mixture into the clearance are disposed at a longitudinal spacing at positions below the lower ends of the second constricted portions.

* * * * *